US007860889B1

(12) United States Patent
Martino et al.

(10) Patent No.: US 7,860,889 B1
(45) Date of Patent: Dec. 28, 2010

(54) METHODS AND APPARATUS FOR REDETERMINING SOCIAL MAPS UPON EXPECTATION OF CHANGE

(75) Inventors: Paul J. Martino, Mountain View, CA (US); Chris Vale, San Francisco, CA (US); Kristopher C. Wehner, Oakland, CA (US)

(73) Assignee: Cisco Technology, Inc., San Jose, CA (US)

(*) Notice: Subject to any disclaimer, the term of this patent is extended or adjusted under 35 U.S.C. 154(b) by 199 days.

(21) Appl. No.: 11/123,844

(22) Filed: May 6, 2005

Related U.S. Application Data (60) Provisional application No. 60/570,911, filed on May 12, 2004.

(51) Int. Cl.
G06F 7/00 (2006.01)
G06F 17/30 (2006.01)
(52) U.S. Cl. ....................... 707/784; 707/802
(58) Field of Classification Search ................ 707/802, 707/781, 784, 999.009, 999.102
See application file for complete search history.

(56) References Cited

U.S. PATENT DOCUMENTS

| | | | |
|---|---|---|---|
| 6,112,181 A | 8/2000 | Shear et al. | |
| 6,134,566 A | 10/2000 | Berman et al. | |
| 6,175,831 B1 | 1/2001 | Weinreich et al. | |
| 6,295,526 B1 | 9/2001 | Kreiner et al. | |
| 6,622,147 B1 | 9/2003 | Smiga et al. | |
| 6,745,196 B1 | 6/2004 | Colyer | |
| 6,868,389 B1 | 3/2005 | Wilkins et al. | |
| 7,069,308 B2 * | 6/2006 | Abrams .................. | 709/218 |
| 7,113,917 B2 | 9/2006 | Jacobi et al. | |
| 7,167,910 B2 * | 1/2007 | Farnham et al. ........... | 709/223 |
| 7,177,880 B2 | 2/2007 | Ruvolo et al. | |
| 7,275,102 B2 | 9/2007 | Yeager et al. | |
| 7,289,965 B1 | 10/2007 | Bradley et al. | |
| 7,318,037 B2 | 1/2008 | Solari | |
| 2001/0014868 A1 | 8/2001 | Colyer | |

(Continued)

FOREIGN PATENT DOCUMENTS

EP     1288795 A1     3/2003

(Continued)

OTHER PUBLICATIONS

Balabanović et al., "Content-Based, Collaborative Recommendation," Mar. 1999, ACM, vol. 40, No. 3, pp. 66-72.

(Continued)

*Primary Examiner*—Hosain T Alam
*Assistant Examiner*—Van H Oberly
(74) *Attorney, Agent, or Firm*—Patent Capital Group (57) ABSTRACT

A method for a computer system includes receiving an identifier from a user, initiating a user session in response to the identifier, determining a social map for the user in response to the identifier and in response to a plurality of social network relationships, receiving a first change to the plurality of social network relationships from the user, receiving a second change to the plurality of network relationships from another user, determining a revised social map for the user during the user session in response to receiving the first change, but not in response to receiving the second change, wherein the revised social map for the user reflects the first change and the second change, and storing the revised social map for the user during the user session in a cache.

17 Claims, 8 Drawing Sheets

U.S. PATENT DOCUMENTS

| | | | |
|---|---|---|---|
| 2002/0138289 | A1 | 9/2002 | Thielges et al. |
| 2002/0178161 | A1 | 11/2002 | Brezin et al. |
| 2003/0050977 | A1* | 3/2003 | Puthenkulam et al. ...... 709/204 |
| 2003/0158855 | A1 | 8/2003 | Farnham et al. |
| 2003/0167324 | A1 | 9/2003 | Farnham et al. |
| 2003/0200112 | A1 | 10/2003 | Royall et al. |
| 2003/0216986 | A1 | 11/2003 | Hassan |
| 2004/0167794 | A1 | 8/2004 | Shostack et al. |
| 2005/0021750 | A1* | 1/2005 | Abrams ...................... 709/225 |
| 2005/0131884 | A1 | 6/2005 | Gross et al. |
| 2005/0210008 | A1 | 9/2005 | Tran et al. |
| 2005/0210102 | A1 | 9/2005 | Johnson |
| 2005/0256866 | A1 | 11/2005 | Lu et al. |
| 2006/0167864 | A1 | 7/2006 | Bailey et al. |
| 2007/0088614 | A1 | 4/2007 | Huo |

OTHER PUBLICATIONS

Kautz et al., Combining Social Networks and Collaborative Filtering, Mar. 1997, vol. 40, No. 3, pp. 63-65.

Schafer et al., "Recommender Systems in E-Commerce," 1999, ACM, Proceedings of the 1st ACM conference on Electronic Commerce, pp. 158-166.

U.S. Appl. No. 11/102,572, filed Apr. 7, 2005, entitled "Hierarchical Posting Systems and Methods with Social Network Filtering," Inventor(s) Paul J. Martino, et al.

U.S. Appl. No. 11/102,565, filed Apr. 7, 2005, entitled "Restricting Hierarchical Posts with Social Network Metrics Methods and Apparatus," Inventor(s) Paul J. Martino, et al.

U.S. Appl. No. 11/102,573, filed Apr. 7, 2005, entitled "Methods and Apparatus for Integrating Social Network Metrics and Reputation Data," Inventor(s) Brian Lawler, et al.

U.S. Appl. No. 11/123,854, filed May 6, 2005, entitled "Dynamic Social Network Relationship Determination Method and Apparatus," Inventor(s) Paul J. Martino, et al.

U.S. Appl. No. 11/123,853, filed May 5, 2005, entitled "Methods and Apparatus for Determining Social Relevance in Near Constant Time," Inventor(s) Paul J. Martino, et al.

U.S. Appl. No. 11/221,573, filed Sep. 7, 2005, entitled "Dynamic Social Network Relationship Determination Method and Apparatus," Inventor(s) Paul J. Martino, et al.

U.S. Appl. No. 11/102,569, filed Apr. 7, 2005, entitled "Communication Systems and Methods with Social Network Filtering," Inventor(s) Brian Lawler, et al.

U.S. Appl. No. 11/222,685, filed Sep. 8, 2005, entitled "Social Network Augmentation of Search Results Methods and Apparatus," Inventor(s) Brian Lawler, et al.

U.S. Appl. No. 11/223,452, filed Sep. 8, 2005, entitled "Social Network Filtering of Search Results Methods and Apparatus," Inventor(s) Brian Lawler, et al.

U.S. Appl. No. 11/123,852, filed Apr. 7, 2005, entitled "Methods and Apparatus for Targeting communications Using Social network Metrics," Inventor(s) Brian Lawler, et al.

Fahl, Gustov and Tore Risch, "Query processing over object views of relational data," The VLDB Journal 6 (1997), pp. 261-281.

Brio Technology; Secure Business Intelligence with Brio Enterprise Meeting user's needs for flexible data access, while providing robust security with Brio Enterprise 5.5. http://www.gtech.com.tr/Kutuphane/Secure_Business_Intelligence_with_Brio_Enterprises.pdf, Nov. 1998, Oct. 16, 2008.

* cited by examiner

METHODS AND APPARATUS FOR REDETERMINING SOCIAL MAPS UPON EXPECTATION OF CHANGE

CROSS REFERENCE TO RELATED APPLICATIONS

The present invention claims priority to Provisional Application No. 60/570,911 filed May 12, 2004 and incorporates it by reference for all purposes. The present invention also incorporates by reference, for all purposes application Ser. No. 11/102,570 filed Apr. 7, 2005, titled: Methods and Apparatus for Targeting Communications Using Social Network Metrics.

BACKGROUND OF THE INVENTION

The present invention relates to social networks. More specifically, the present invention relates to methods and apparatus for providing high-performance relationship reporting between users in a social network.

Conventional methods for determining the relationships between a user and other users in a network of users have included the use of a relational database to store, determine and provide the relationships.

The primary difficulty with such approaches is the exponential growth of size of a social network. For example, if a first user knows "n" (e.g. 100) second users on the social network, and each of the "n" (e.g. 100) second users knows "n" (e.g. 100) unique third users, etc., the first user may have $n^2$ (e.g. $100^2=1,000$) users in their social network that are within two "degrees of separation" away. Additionally, the first user may have $n^3$ (e.g. $100^3=100,000$) users in their social network that are within three "degrees of separation" away. Accordingly, when a social network has a large number of users, the number of computations required to determine a social map increases dramatically (e.g. exponentially). As a result, performing social network calculations on large social networks cannot be done in real-time, as such a system would take too long to compute whenever there is a change in the social network.

The inventors of the present invention believe that relational databases alone are not well-suited to perform social network calculations because of this exponential growth in size of a user's social map when a small number of first degree (direct) relationships are added to the whole social network.

One attempt to address this exponential computation growth has been to perform such computations at night time, at off-peak hours, or other specified batch time. The computations of users' social map would then be stored in memory for use at a later time, until the next batch time. Between computations, the cached computation data would then provided to the user when requested. Drawbacks to this approach included that when the user requested their social map, the user network, the user would be provided with a copy of the data previously cached at batch time. Further, any changes initiated by the user before the next batch process, would not be visible until the next batch time. Additional drawbacks included that caching the relationship data for a large number of users would be prohibitively hardware expensive.

In light of the above, what is required are improved methods and apparatus that address the issues above.

BRIEF SUMMARY OF THE INVENTION

The present invention relates to methods and apparatus for dynamically determining relationships in a social network. In various embodiments, determination of these relationships are typically performed in real time. In some embodiments of the present invention, the relationships are determined for a user when the user logs into the social network, accordingly, the relationship data are virtually always up-to-date.

Additional embodiments of the present invention determine the relationship data more efficiently and quickly than using conventional methods. Further, other embodiments allow users to query and receive relationship data between a user and a target user dynamically. In embodiments of the present invention, relationship data for a user is computed at user log-in time and cached. Accordingly, the social map of the user is virtually up-to-date each user session. Additionally, in various embodiments, one or more "dirty" bits may indicate whether the cached copy of the social map is stale and should be recomputed or not. In various embodiments the relationship data for a user may be recomputed and cached during a particular session, typically when the user has an expectation of a change. For example, if the user modifies her relationships with another user, or the like, the user would expect that modification to be reflected in her relationship data. In other embodiments, the relationships data for a user can be performed on demand, and in real-time.

According to one aspect of the invention, a method for a computer system is described. On technique may include receiving an identifier from a user, initiating a user session in response to the identifier, and determining a social map for the user in response to the identifier and in response to a plurality of social network relationships. Additional processes may include receiving a first change to the plurality of social network relationships from the user, and receiving a second change to the plurality of network relationships from another user. Various methods may include determining a revised social map for the user during the user session in response to receiving the first change, but not in response to receiving the second change, wherein the revised social map for the user reflects the first change and the second change, and storing the revised social map for the user during the user session in a cache.

According to another aspect of the invention, a computer system is disclosed. The system may include a memory configured to store a plurality of social network relationships. The apparatus may also include at least one processing unit coupled to the memory, wherein the processing unit is configured to receive an identifier from a user, wherein the processing unit is configured to initiate a user session in response to the identifier, wherein the processing unit is configured to determine a social map for the user in response to the identifier and in response to the plurality of social network relationships, wherein the processing unit is configured to receive a first change to the plurality of social network relationships from the user during the user session, wherein the processing unit is configured to receive a second change to the plurality of network relationships from another user during the user session, wherein the processing unit is configured to determine a revised social map for the user during the user session in response to receiving the first change, wherein the revised social map for the user reflects the first change and the second change, wherein the processing unit does not determine the revised social map in response to receiving the second change. Various devices include a cache configured to store the revised social map for the user during the user session. In various systems the memory is configured to store the first change to the plurality of social network relationships and to store the second change to the plurality of social network relationships.

According to yet another aspect of the invention, a computer program product for a computer system including a processor and a memory including a plurality of social network relationships is disclosed. The computer program product includes code that directs the processor to initiate a session for a user, code that directs the processor to determine a social map for the user in response to the plurality of social network relationships, and code that directs the processor to determine a first change to the plurality of social network relationships for the user. The computer program product may also include code that directs the processor to determine a second change to the plurality of network relationships for another user, code that directs the processor to determine a revised social map for the user during the session in response to determining the first change, but not in response to determining the second change, wherein the revised social map for the user reflects both the first change to the plurality of network relationships and to the second change to the plurality of social network relationships, and code that directs the processor to cache the revised social map for the user during the session. The codes reside on a tangible media such as a semiconductor-based media, optical media, magnetic media, organic media, or the like.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

The following definitions are used in the present application:

Degrees of Social Separation—A value defined as immediate friends (or acquaintances) of a user being a first degree; friends of the user's immediate friends being a second degree; etc. Degrees of Social Separation may also refer to affinity groups, with members of the same affinity group being a first degree; members of directly related affinity groups being a second degree; etc. Degrees of social separation may also refer to a combination of ties between friends and ties between members of affinity groups. In various embodiments, degree of social separation between different users may be different depending upon which of the above separation distances are used, and based upon the context in which the degree is to be used.

In various embodiments, the degree of social separation between different users may be different depending upon which metric for separation distances are used, and depending upon the context in which the separation distance is to be used. Additionally, users may have different social separations for different user profiles. For example, two users may have a large social separation when considering personal profiles, but a small social separation when considering membership profiles in affinity groups.

Social distance—A numeric value associated with the Degrees of Social Separation between a first user and a second user. In embodiments of the present invention, a smaller social distance between users represents a higher "trust" level between the users. For example, in many cases, a user will trust her immediate friends (social distance=1); however, a user will trust a friend of her immediate friend (social distance=2) to a smaller degree; and a user will trust a friend of a friend of her immediate friend (social distance=3) even less; and so on. In various embodiments, social distance need not be an integral value and may be a floating point number, for example social distance=4.2, social distance=1.5, etc. In such embodiments, other weighting factors other than mere degree of social separation are considered, such as "importance" of the relationships between the users, the frequency of communications between the users, the frequency and/or quality of business relationship between the users, and the like. Other types of "fuzzy" weighting factors may include frequency of communication between users, common posts to similar forums, and the like.

In embodiments of the present invention, social distance may be symmetric or asymmetric. As an example of this, a social distance between user A and user B may be the same (e.g. 1.4), when both user A and user B value their relationship the same. However, if user A values the relationship more than user B, the social distance from user B to user A may be smaller (e.g. 1.3) than from user A to user B (e.g. 1.8). Some of the factors described above may be used to determine weighting of the relationships, including user satisfaction of a transaction, responsiveness to correspondences or queries, performance, common interests, common posting forum, and the like. In various embodiments, a link weight may be affected by the symmetry or asymmetry of the links between participants. As an example, a bi-directional link may be or more value if both parties have confirmed the relationship. In embodiments of the present invention, the social distance between two users may be computed in real time.

In various embodiments, the relationship weighting factors may be manually determined by the user. For example, user A rates a concluded transaction between user A and user B; user B rates the timeliness of user A payment speed; and the like. In alternative embodiments, the relationship weighting factors may automatically be determined. For example, the frequency of communications between users may indicate a more valued relationship between the users, accordingly, the social distance between users may be shortened. In other examples, the more frequently two users post messages to an affinity group forum or post messages on the same thread in the forum, the higher their weighting factor relative to each other. In such embodiments automatically increasing weighting factors between the users is useful because it infers that users have shared interests. Other types of inferences based on user behavior are contemplated in other embodiments.

In other embodiments, users can decrease their social distance to other users by their own actions. Actions may include quickly responding to e-mail messages, or other communications are replied-to, responsiveness weighting factor of a user may be increased; as another example, frequency of checking e-mail messages or logging into the social network, or the like. As an example, if a user runs a business in the social network, by increasing her quality of service, and client satisfaction, her reputation factor may increase. Accordingly, social distances computed to users coupled to the business in the social network may automatically decrease, because of her increased reputation. As another example, establishing a two-way confirmed link is another example. In various embodiments, two-way link confirmation may use techniques taught in U.S. Pat. No. 6,175,831.

Tribe—An affinity group. One example is similar to a Usenet group, having a user moderator, user participants, discussion forums, etc; whereas in other examples, an affinity group need not have a moderator, leader, or the like. In embodiments of the present invention, two users may be connected in the social network by being members of the same affinity group, even though the two users may otherwise have a large social distance between them.

In various embodiments of the present invention, Tribe membership may be explicitly defined or implicitly defined. Accordingly, Implied Tribes may be determined. These tribes are groupings of users based on a common interest, common activity, or any other type of trait held by two or more users, without an explicit definition. Examples of implied tribes may include users who list a common interest, such as "skiing," users who view a particular classified listing, restaurant review, or the like.

In some embodiments of the present invention, members of affinity groups or groups of users are logically organized as one user (super node). In such embodiments, relationships of members are collapsed and imputed to the affinity group. For example, a clique of three close friends may be considered a super node, for sake of simplicity when performing relationship computations. The relationships of the super node may include the relationships of its underlying users. For example, a ski Utah affinity group may have users A, B, and C, thus the ski Utah affinity group super node will have the affinity relationships of its users A, B, and C. Accordingly, affinity groups can have social distances from other affinity groups. In another example, the ski Utah affinity group will combine the personal relationships of its users A, B, and C. In various embodiments, for this example, the ski Utah affinity group will list both the ski Utah affinity group relationships and the ski Utah affinity group personal relationships side-by-side. These relationships may be represented by a graph, or as desired. In other embodiments, the relationships of the affinity group are expanded and imputed back to the members of the affinity group.

Tribe Mapping—A process of determining a bottom-up taxonomy for related tribes based on common user membership overlap. These maps may be computed based upon explicit tribe membership data, or implicit tribe membership, as described above. For example, if 75% of the users in a bird-watching tribe also view communications on spotting scopes, a tribe mapping may closely associate the bird-watching tribe with an implied spotting-scope tribe. As another example, a "San Francisco Wine Drinker" tribe will most likely have a significant overlap with a "San Francisco" tribe, and a "Wine Drinker" tribe. This mapping can be performed automatically through algorithms that compute similarity, or manually by moderators of the tribes, who explicitly state their relationship. Additionally, determining a Tribe Map may be performed on demand. Accordingly, overlap of affinity groups may be explicit or implicit. The relationship between tribes can then be used as part of a social network filter or affinity filter criteria, described further below.

User Network—A subset of all users on the social network. In embodiments of the present invention, a User Network may be socially limited to a specified social distance from the user and/or by affinity groups which the user is a member of. For example, a user network may include all users within a social distance (or affinity distance) of 3.5. A user network may also be termed a "social network" for the user or a "social map" for the user.

In other embodiments, the user network may constrain the type of information available to the user. As examples, users may be constrained to searching for information (e.g. job posts) from users only within their user network; users may be limited to sending e-mails or invitations, or chatting only with other users in their user network. Many other restrictions can be envisioned to be placed on users based upon their relationships in the social network.

In various embodiments, users may explicitly state that certain users, groups of users, and the like are detrimental and should not be included in the user network. For example, an individual may wish to exclude their membership in a drug-abuse counseling group, from the individual's other friends. In such embodiments, the system 100, described below, treats such nodes as "stop nodes." Accordingly, when system 100 computes the user network, when these nodes are encountered, no link is returned and no further social distance computations are performed. This can be used inductively to also exclude other links to such nodes (e.g. other members of the drug-abuse counseling group.

Social Map—A map of connections from one specific user to other users on the system. It can be collection of User Networks at various relevance thresholds such as 1, 2, 3, 4 and typically includes a shortest path between two users, either via friendship, affinity group, or the like. In some embodiments, a social map for a user is typically socially limited to a specified social distance from the user. In embodiments of the present invention, the limited distance may be specified by an administrator, the user, or the like.

Social Network—A network of relationships between users (via friendship, affinity, or the like).

People Web—A unified collection of social networks into a complete social map. Unifying identities across social networks allows one to traverse the social map in a way similar to DNS for network traffic.

Figure 1:
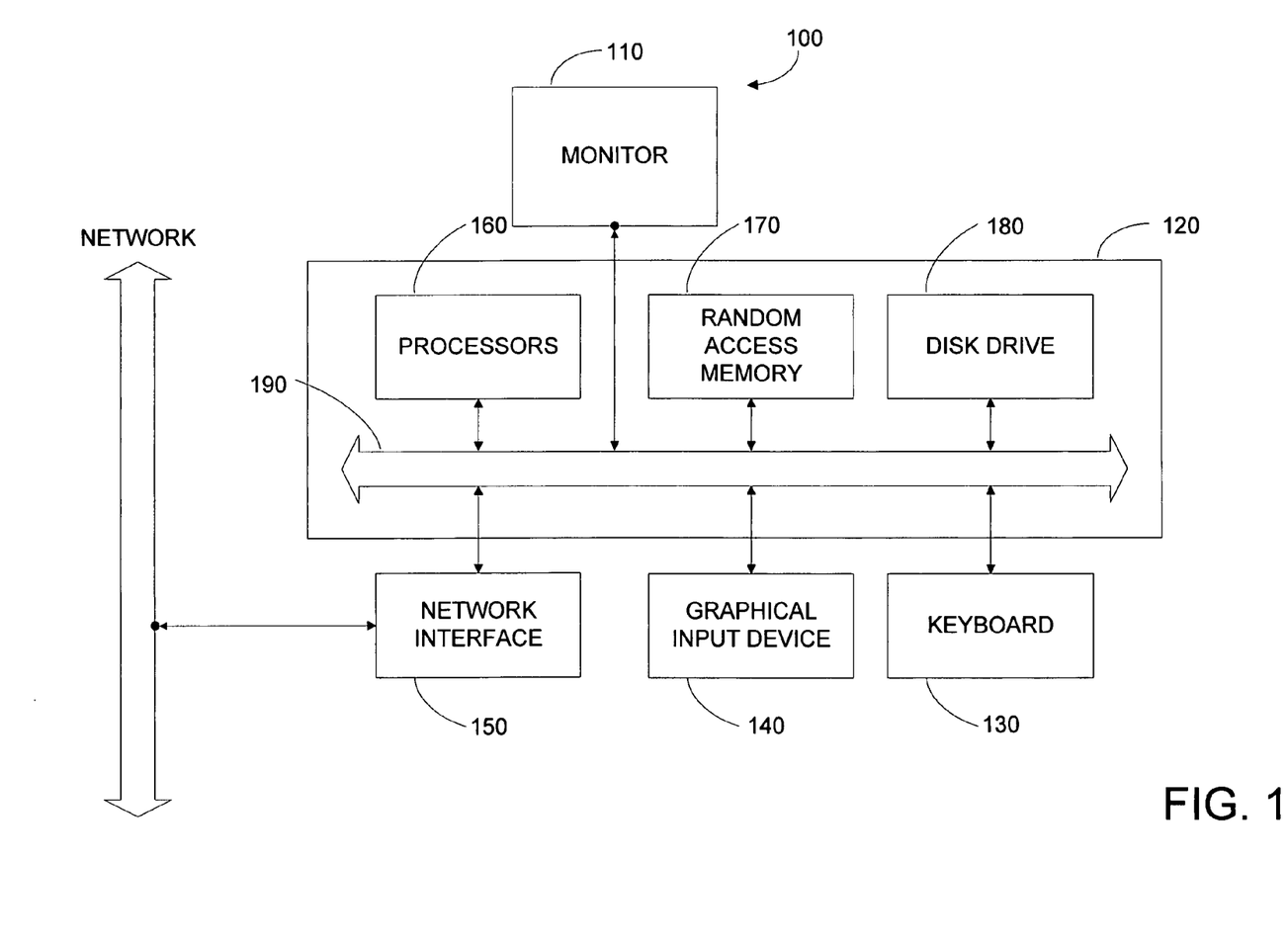
FIG. 1 is a block diagram of typical computer system according to an embodiment of the present invention.

FIG. 1 is a block diagram of typical computer system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, wireless remote, and the like. User input device 140 typically allows a user to select objects, icons, text and the like that appear on the monitor 110.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having one or more microprocessors from Intel Corporation, or the like. Further, in the present embodiment, computer 120 typically includes a UNIX-based operating system.

RAM 170 and disk drive 180 are examples of tangible media for storage of data, audio/video files, computer programs, user profile card data, user social network-related data, social distance computation programs, hierarchal posting data, social network filtering criteria, other embodiments of the present invention and the like. Other types of tangible media include magnetic storage media such as floppy disks, hard disks, removable hard disks; optical storage media such as CD-ROMS, DVDs, bar codes, holographic; semiconductor memories such as flash memories, read-only-memories (ROMS), volatile memories; networked storage devices; and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of computer rendering systems capable of embodying the present invention. It will be readily apparent to one of ordinary skill in the art that many other hardware and software configurations are suitable for use with the present invention. For example, the use of other micro processors are contemplated, such as Pentium™ or Itanium™ microprocessors; AthlonXP™ microprocessors from Advanced Micro Devices, Inc; PowerPC G4™, G5™ microprocessors from Motorola, Inc.; and the like. Further, other types of operating systems are contemplated, such as Windows® operating systems (e.g. WindowsXP®, WindowsNT®, or the like) from Microsoft Corporation, Solaris from Sun Microsystems, LINUX, UNIX, MAC OS from Apple Computer Corporation, and the like.

Figure 2:
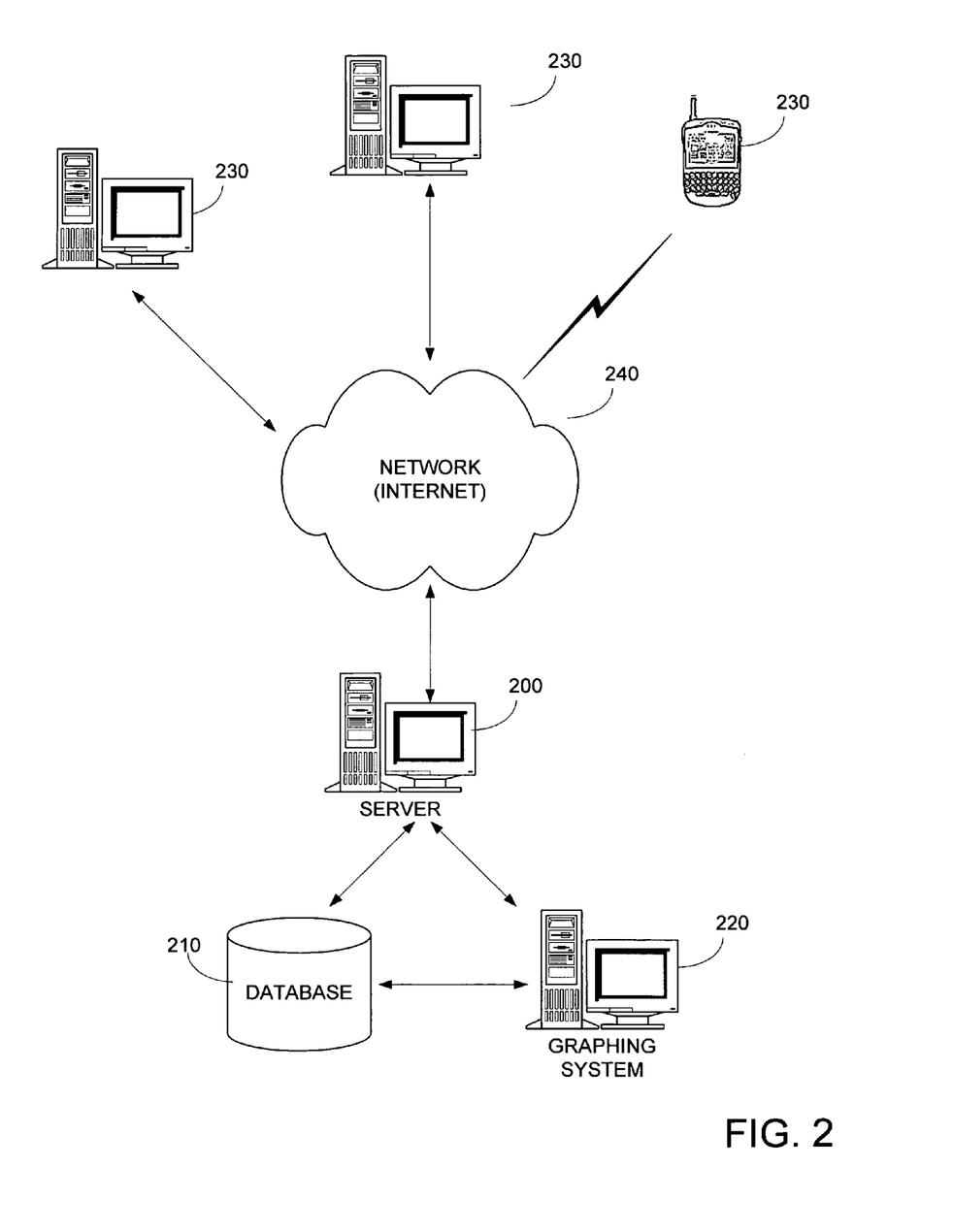
FIG. 2 illustrates a block diagram according to an embodiment of the present invention.

FIG. 2 illustrates another block diagram according to an embodiment of the present invention. FIG. 2 includes a server 200 coupled to a database 210 and coupled to a graphing system 220. A plurality of users 230 are coupled to server 200 via a network 240, such as the Internet.

In the present embodiments, users 230 may be any conventional access device, such as a computer, a web-enabled telephone, a personal digital assistant, or the like. In operation, users 230 log into server 200 and then makes one or more requests for data. The data that is returned is typically displayed back to user.

In various embodiments, server 200 may be embodied, as described above, and include one or more application servers (e.g. server cluster) that respond to requests from users 230. For example, server 200 may be an web server. Additionally, multiple servers may be used in embodiments where server performance is important, e.g. East Coast server for client requests from Boston, Midwest server for client requests from Chicago, and the like. Server 200 may be configured as illustrated in FIG. 1, above.

Database 210 may be any conventional database such as powered by MySQL, Oracle, Sybase, or the like. In other embodiments, database 210 may be any other data source such as an LDAP server, or the like. In the present embodiment, database 210 is configured to store and maintain user data, to store and maintain relationship data between the users, and configured to make changes to relationship data between users, among other functions. As illustrated, database 210 may be coupled to server 200 and to graphing system 220 to send and receive respective data, as will be described below.

In various embodiments, graphing system 220 is a stand-alone computer system configured to receive data from server 200, and configured to store and maintain relationship data between the users. Additionally, in various embodiments, graphing system 220 is configured to determine and provide requested relationship data to server 200. In various embodiments, graphing system 220 may be integrated as a part of server 200, or the like.

In various embodiments, graphing system 220 may be a conventional computer system, as described above. In one embodiment, graphing system 220 maintains in the relationship data of users (including adjacency information and/or associated weights) in RAM. In other embodiments of the present invention, graphing system 220 may store a portion of the relationship data of users in RAM. The other portions of the relationship data of users may be stored on magnetic disk or other media, on database 210, or the like. In such embodiments, elements of the relationship data of users can be loaded into a most recently used (MRU) queue.

In the present embodiment, graphing system 220 computes social relationships in real time by minimizing lookup time of required information. For example, lookup operations such as: who are the direct friends of person A?, who are the members of tribe B?, what is the social map for person A, what is the shortest social distance between person A and person B, what are the shortest paths between person A and person B, what is the shortest path between person A and person B, etc, are preformed in constant or near constant time. In additional embodiments, graphing system 220 may determined updated social maps for a user when the user adds a link to another user, deletes a link to another user, confirms an addition or deletion of a link to another user, and the like. In various embodiments, graphing system 220 stores relationship data for users in RAM in a way that allows explicit control over memory allocation. In some embodiments of the present invention, it is expected that graphing system 220 will be able to compute social distance computations on a social network of up to 20 million users, within 20 milliseconds or less. In other embodiments, it is expected that graphing system 220 will be able to compute a user's social map across a social network of 10 million users within 20 milliseconds and/or will be able to determine all shortest paths between two users on a similar sized network also within a similar amount of time, e.g. 20 milliseconds.

In embodiments of the present invention, graphing system 220 may include a number (e.g. cluster) of individual systems. In various embodiments, the individual systems may store unique portions of the relationship data of users; the individual systems may store in parallel the same portions (or the entire) relationship data of users; or the like. Any traditional data clustering technique may be used to implement graphing system 220 in embodiments of the present invention.

Additionally, in embodiments, graphing system 220 determines the specific relationships (e.g. social distance queries) primarily in RAM. With such a configuration, the performance of graphing system 220 has proven superior than disk-based computation systems such as conventional databases.

In various embodiments, graphing system 220 includes four software components including two C++ components, and two Java components. In other embodiments, other architectures are envisioned. The C++ components includes a portion that solves social distance queries using the RAM, utilizing a memory efficient graph implementation, as will be discussed below. Additionally, the C++ components includes a daemon process that reads commands and write results to a socket (or other transport medium). By having graphing system 220 respond to relationship queries via a socket, different implementations of the server interface, may be easily used, without touching the C++ components.

In various embodiments, the server interface, i.e. java components, includes a java class that provides APIs to requesting servers, such as server 200. The API's serve as the interface layer to the C++ components. Additionally, the java components includes an interface layer that sends requests to the socket and waits for relationship data on the socket. Since this communication is performed via a socket, any language that supports HTTP can be used. Furthermore, the communication need not be HTTP (or IP) based. In various embodiments, other protocols may be used, such as COM, RCP, REST, SOAP, or the like, which may or may not use the IP layer.

In implementation, graphing system 220 may be multi-threaded and thus can support simultaneous requests from server 200. Additionally, in cases where server 200 includes one or more servers for increasing scale, standard clustering techniques such as data replication can be used to support simultaneous requests from one or more servers. Locks and/or semaphores can be used to enable multi-threaded access to the data, without clients waiting for update of the respective data.

In various embodiments, many different types of relationship data can be determined by database 210 and graphing system 220 including, a shortest path between user A and user B (e.g. SOCIAL_DISTANCE (A,B)), typically a floating point value reflecting the distance from user A to B; shortest paths between user A and user B, for example through user C and user D, or through user E and user F (returned as an array of paths); what users are within or less than N degrees from user A (less than a N social distance); who is the most connected user in the social network, and the like. Many other types of information are reportable within other embodiments of the present invention. In embodiments of the present invention, database 210 and graphing system 220 may communicate with each other via custom function calls from database 210.

The relationship determined may be filtered and sorted in any number of conventional ways based upon various parameters. Additionally, database 210 and graphing system 220 are enabled to received up-dated relationship data, such as adding a new user/friendship relationship or removing a friendship relationship, and to recompute the relationship data, and the like.

Figure 3:
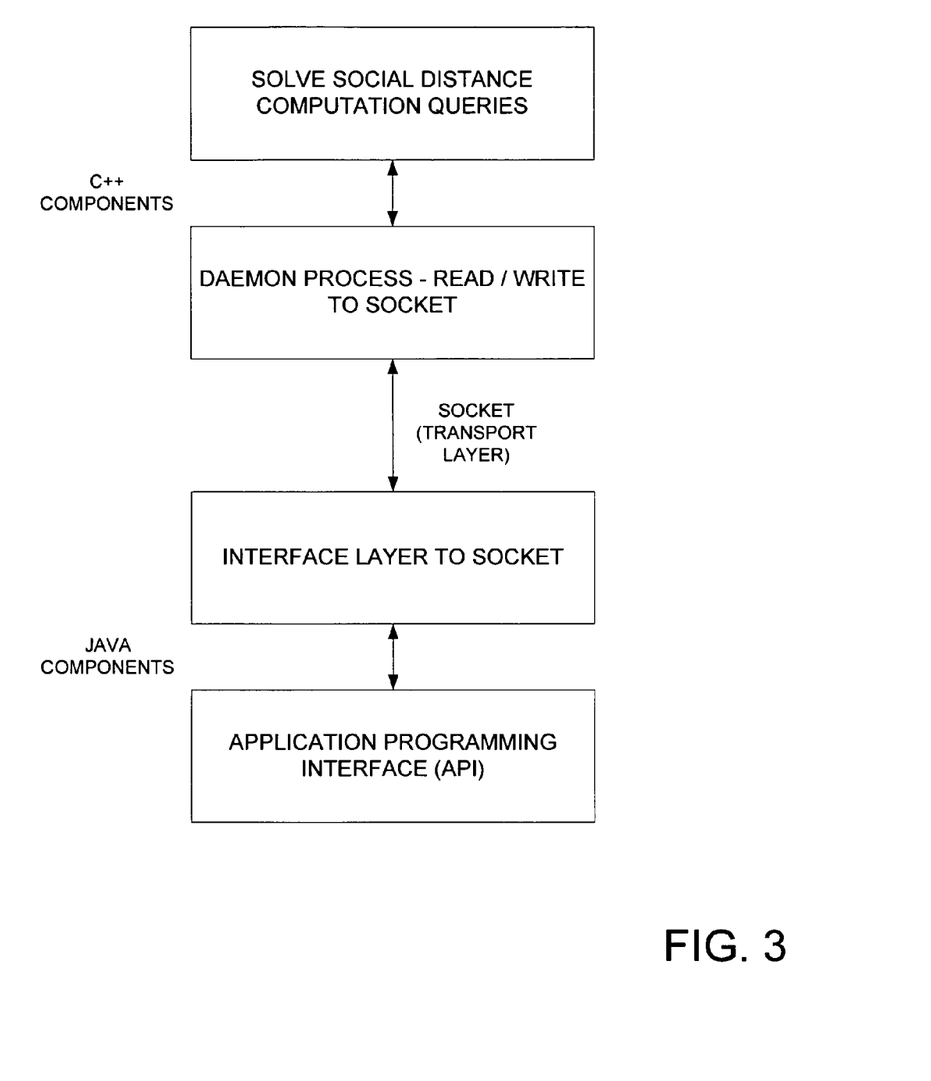
FIG. 3 illustrates another block diagram according to an embodiment of the present invention.

FIG. 3 illustrates an embodiment of the present invention. Specifically, FIG. 3 illustrates functions provided by one embodiment of the present invention.

In one embodiment, each user has an associated (e.g. 32-bit) bit vector or array representing other users connected to the user, i.e. other users at a social distance of one. Additionally, in various embodiments, the bit vector may be stored in either a sparse or dense representation scheme. The density of bit vector is computing by comparing the number of bits in the on state vs. the size of the entire vector. When a sufficient number are on the dense representation is preferred to the sparse. The inventors of the present invention believe such a representation scheme is memory efficient. For example, in a case where 10 million users are each connected to one hundred users, the memory requirement to store first degree social relationships for all users is only about 8 gigabytes. This direct, or first-degree, social network distance can easily fit within RAM of graphing system 220 and can be stored in database 210.

Figure 4A:
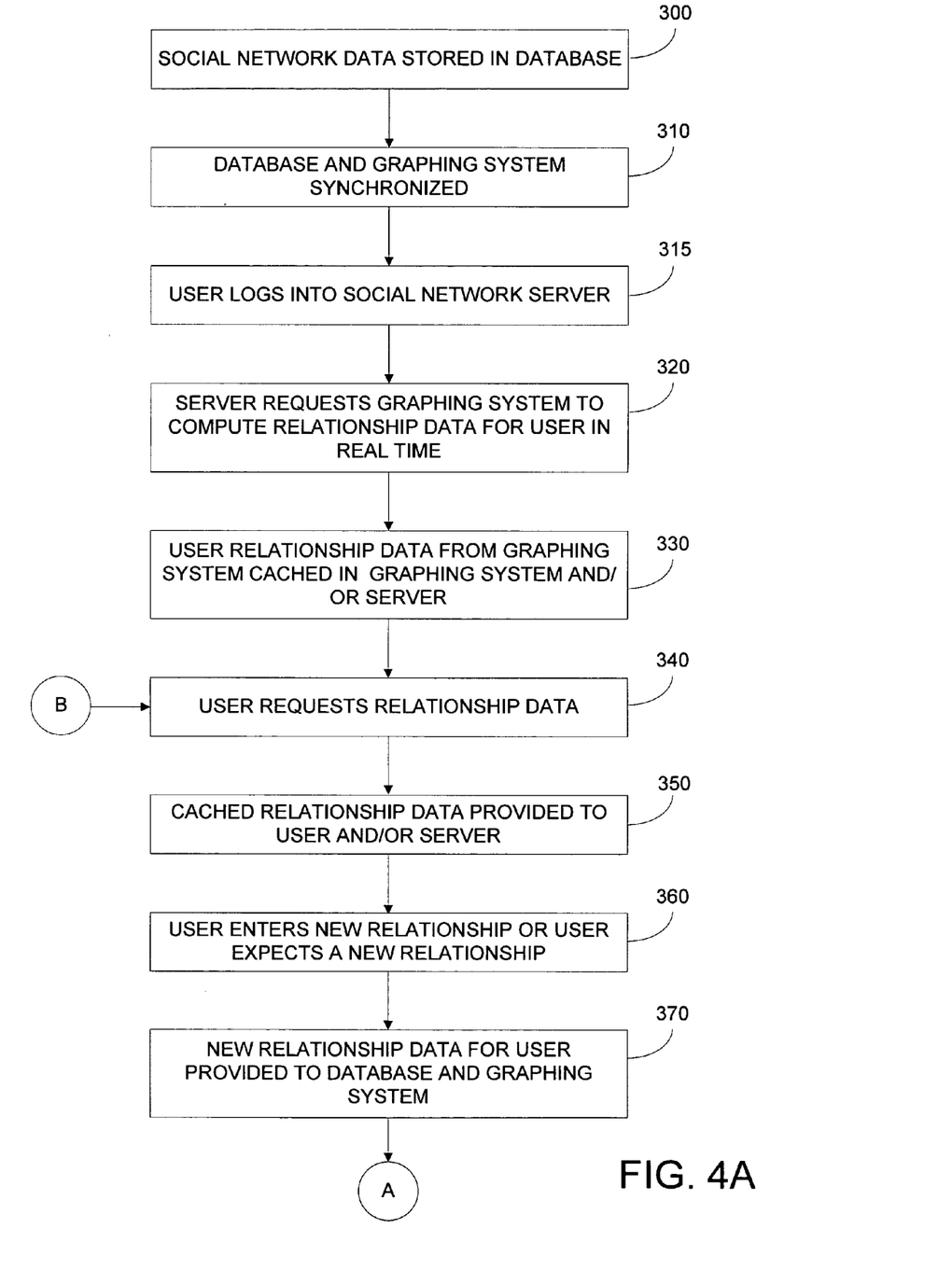
FIGS. 4A-B illustrate a block diagram of an embodiment of the present invention.
Figure 4B:
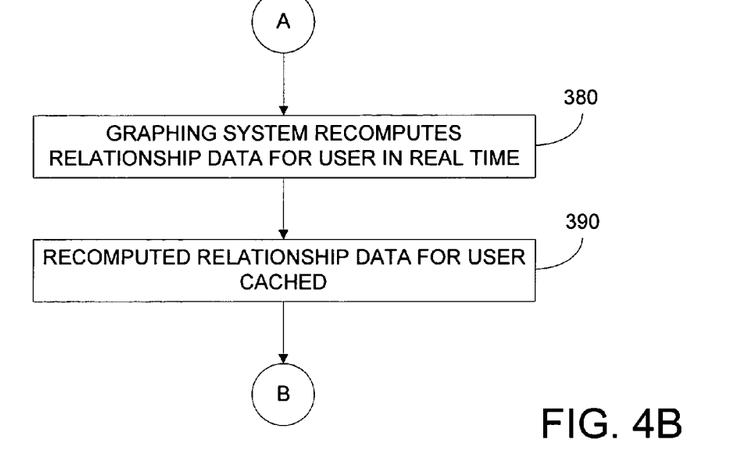

FIGS. 4A-B illustrate a flow diagram according to an embodiment of the present invention.

Initially, user relationship data is stored in database 210, step 300. Next, graphing system 220 is initiated and portions of the relationship data between users is copied to graphing system 220 memory, step 310. As described above, the user data is typically stored in graphing system 220 RAM.

In various embodiments, graphing system 220 does not "touch" database 210 again after receiving the relationship data between users. In other embodiments, graphing system 220 may synchronize its data with database 210 periodically, for example, once a week, every midnight, every 1000th user, or the like. In other embodiments, synchronization may occur only in cases of error recovery such as when the entire graph exceeds the amount of available RAM, or the like. In which case, paging of the most recently used data can be performed.

Later, a user interfaces with server 200 and logs in using any conventional method, step 315. In response to the user logging in, web server 200 requests graphing system 220 to determine user relationship data for the user, step 320. In various embodiments, the types of operations automatically requested includes determining users within a predetermined number of degrees from the user or within a predetermined social distance away from the user, and the like.

In some embodiments, the relationship data is a collection of masking (filtering) bit vectors across all other users on the system. The bit vectors may be returned for a requested social distance, for example, the relationship data for a user may include a collection of bit vectors in which a bit is on if the corresponding user is within 1.5, 3, or 4 degrees of social separation away or less. This vector can be stored in a sparse or dense representation depending on which approach is most storage or time efficient.

In response, graphing system 220 performs the relationship computations, and returns the relationship data to server 200. In various embodiments, graphing server 220 caches the relationship data in RAM, step 330. In this embodiment, as this operation is performed at user log-in time, the data represents a view of the social map of the user at log-in time.

In FIGS. 4A-B, the user subsequently requests to view their social map, or initiates a query for data drawn from the social network, step 340, and receives the copy from server 200, step 350. The social map need not be provided to the user immediately at log-in, but may be provided when requested by the user, after the user logs-in. In embodiments of the present invention, because the relationship data is computed and cached at log-in time, the user typically receives a response to their request from server 200 very quickly. Accordingly, the user experience is believed to be superior to other systems relying upon real-time database querying and wait-for-response.

In other embodiments of the present invention, the social map of the user may be computed in real-time in response to a user's request. The caching of the relationship data for the user at log-in time and retrieval of the cached data is therefore merely an design choice. As described below, because users' often expect data to be static during their session, caching of the data maintains their expectations.

In still other embodiments, alternative to steps 240 and 250 may be performed. For example, in some cases, the user may submit a query that requires data from both database 210 and from graphing system 220 to be combined. In other cases, a social distance calculation can be embedded in the database itself (using a linkable binary such as a dll, or the like.). Such embodiments will be discussed further below.

In the present embodiment, during the user session, the user may enter a new relationship, step 360. The new relationship may include, adding a friend, joining an affinity group, conducting a transaction with another user, rating another user, deleting a friend, quitting an affinity group, and the like. In response, server 200 sends a copy of the new relationship to database 210 and to graphing system 220, step 370. The relationship data is used to update data in database 210 and to update the relationship data stored in RAM in graphing system 220. In other embodiments, the new relationship may be daisy-chained from server 200 to graphing system 220, then from graphing system 220 to database 210; or from server to database 210, then from database 210 to graphing system 220.

In various embodiments, as shown above, modifications to the user data is typically passed to both database 210 and to graphing system 220. Accordingly, the data respectively stored in each system should theoretically both be up to date. In some cases, graphing system 220 may periodically synchronize its data with database 210 to ensure graphing system 220 is up-to-date. In some embodiments, it is contemplated that synchronization is only needed for error recovery purposes. For error recovery purposes, in some embodiments, the data should not be out of synchronization by design. In addition, a trigger could be used such that the database notifies the graph system directly, instead of the application notifying both the database and the graph system.

In the present embodiment, in response to the new relationship, graphing system 220 recomputes a new social map for the user, step 380. The new social map may be cached in RAM of graphing system 220 and/or application server 200, step 390. The new social map may also be provided to the user.

In various embodiments of the present invention, it is contemplated that many other users may make relationship changes that may or may not directly affect a user's social map. Accordingly, the inventors have determined that it is desirable that a user's relationships, social map, and the like are not recomputed during a user session unless the user requests a change, as in step 360, or when the user expects a change. In that way, the user's social map will be "stable" during a user session. When the user makes a relationship change, as describe above, the user expects that change to affect their social network. Alternatively, when the user is made aware of a relationship being added from a third party to the user, the user expects that change to show up and affect their social network, for example, if a user confirms a relationship proposed by another user, if the user confirms a deleted relationship proposed by another user, or the like. Accordingly, when the user has that expectation of a change, the social network is recomputed or updated, as described in step 380, above. Because of the real time nature of embodiments of this system, the social map presented to a user can change throughout the user session.

In embodiments of the present invention, when the user logs-out, the cached relationship data for the user may be marked as delete-able from graphing server 220 and/or application server 200 step 390. In other embodiments, time-out conditions or other conditions may also be used to delete or invalidate the cached social map from the memory of graphing system 220 and/or server 200.

FIGS. 5A-D illustrate flow diagrams according to additional embodiments of the present invention. In particular, FIGS. 5A-D illustrate embodiments when a user submits a query that requires data from both database 210 (a database query) and graphing system 220 (a social distance computation), in contrast to steps 340 and 350, above. A typical example is a request for all users within 25 miles (database query) that are within a specified social distance (social distance computation).

Figure 5A:
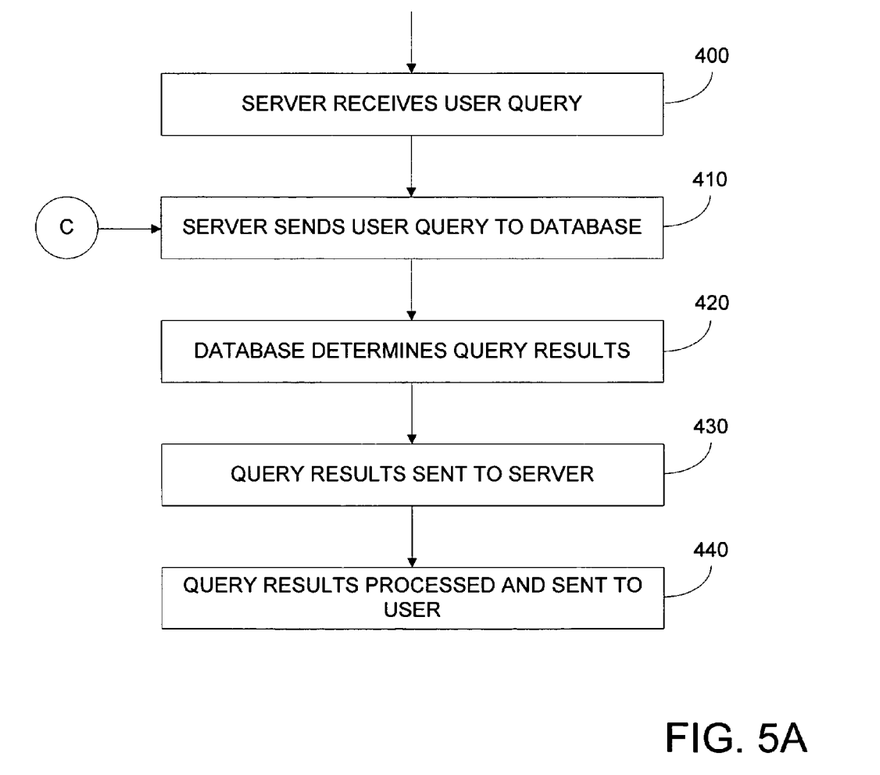
FIGS. 5A-D illustrate another block diagram of an embodiment of the present invention.

In the embodiment in FIG. 5A, the user sends the query to server 200, step 400. Next, server 200 sends the query to database 210 for processing, step 410. In turn, database 210 processes the entire query, step 420, returns the combined query result to server 200, step 430, and server 200 provides the results to the user, step 440. In operation, this embodiment provides sufficient performance when the data set is small. In other words, when a user has a low number of relationships, database 210 can perform the social distance calculation within an acceptable amount of time.

Figure 5B:
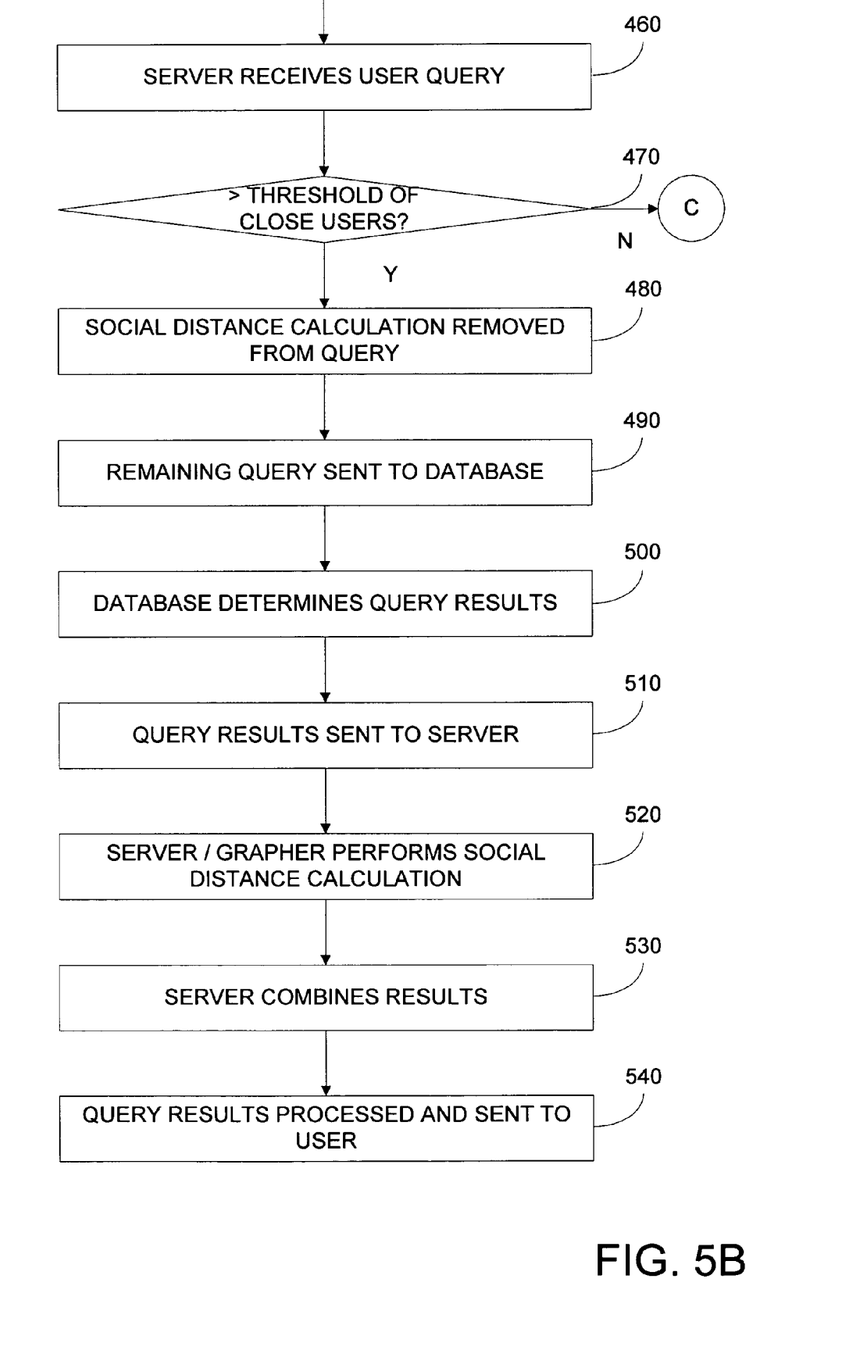

In the embodiment in FIG. 5B, the user sends the query to server 200, step 460. In response, server 200 determines from the cached data whether the user has greater than a threshold number of "close" users, step 470. For instance, server 200 may determine whether the user has less than 1000 users within a predetermined distance away. In other embodiments, the threshold number of users may vary depending upon design considerations. Other thresholds include if the user belongs to a certain number of affinity groups or tribes (both implied or explicit).

In the present embodiment, if the number of "close" users is above a threshold, server 200 removes the social distance calculation from the query, step 480, and sends the remaining database query to database 210, step 490. Next, database 210 processes the database query, step 500, and returns the database query result to server 200, step 510.

In this embodiment, at approximately the same time, or afterwards, server 200 performs the social distance computation requested by the user by the query, step 520. In various embodiments, sever 200 may request graphing server 220 to perform the computation, or server 200 may perform the calculation based upon the previously cached data.

Finally, server 200 combines the social distance computation results and the query results, step 530, and provides the combined results to the user, step 540. Using the example above, in this embodiment, database 210 computes all users that are within 25 miles of the user; and server 200 or graphing system 220 determines the users that are within the specified social distance. With this example, server 200 then performs an intersection function on both of the results to determine the users that are within 25 miles of the user and within the specified social distance. Of course other combinations can be performed depending upon the requested query. For example, the user may request a list of all users with 2 miles and a list of all users within a specified social distance regardless of distance. In such a case the function would be a union function.

In this embodiment, if the number of "close" users is below the threshold, server 200 may send the entire query to database 210, as disclosed in FIG. 4A, above.

Figure 5C:
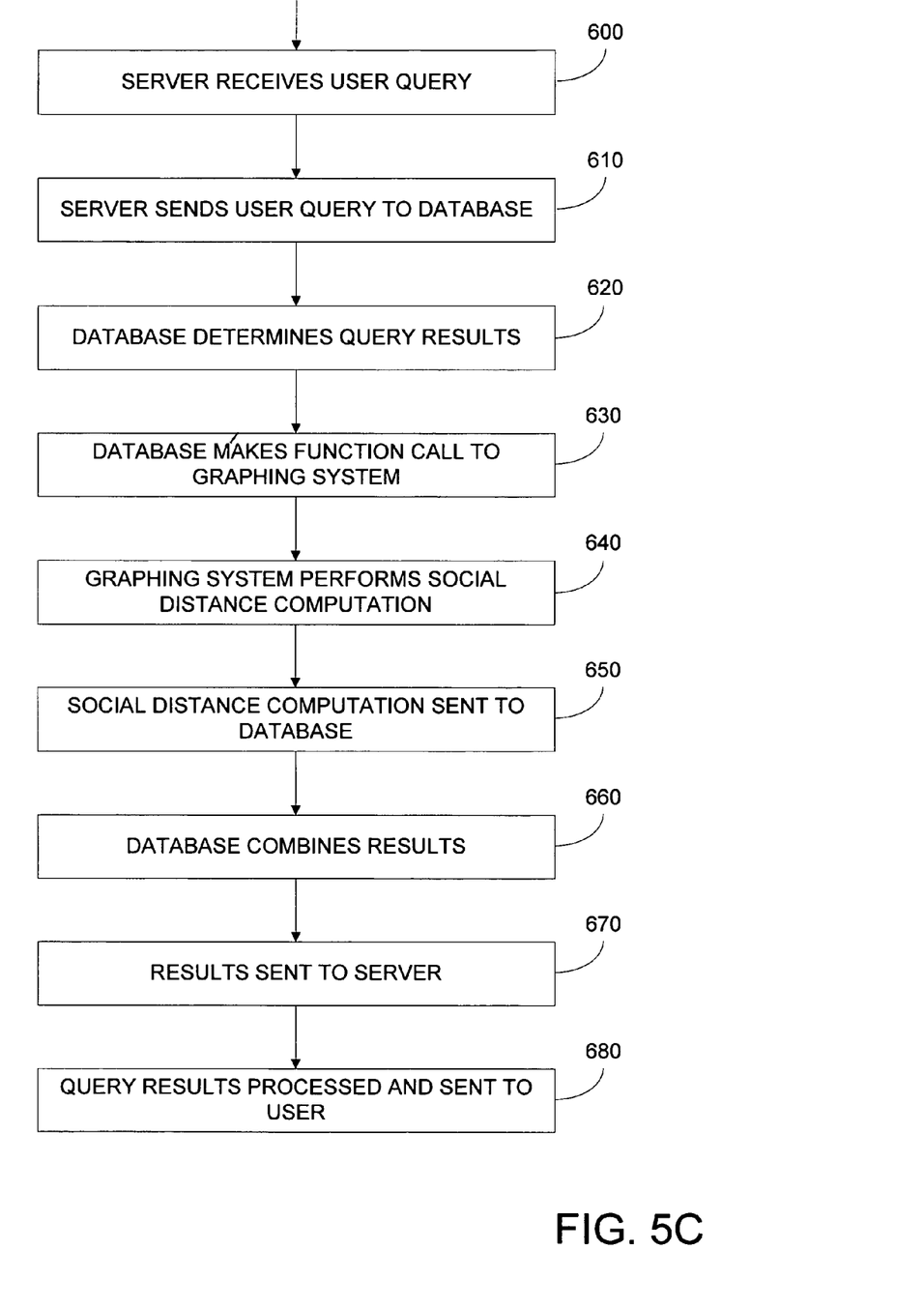

In the embodiment in FIG. 5C, the user sends the query to server 200, step 600. Next, server 200 sends the entire query to database 210 for processing, step 610. In this embodiment, database 210 performs the database query portion of the query, step 620 and makes one or more function calls directly to graphing system 220, step 630. In this embodiment, database 210 requests graphing system 220 to perform the social distance computations. In response, graphing system 220 performs the calculation, step 640, and provides the social distance results to database 210, step 650. Database 210 then combines the social distance results with the database query result, step 660 and provides the combined result to server 200, step 670. In various embodiments, the computation can be embedded into database 210 via a linkable binary, such as a dll or the like. As illustrated in FIG. 4C, server 200 then provides the combined result to the user, step 680.

Figure 5D:
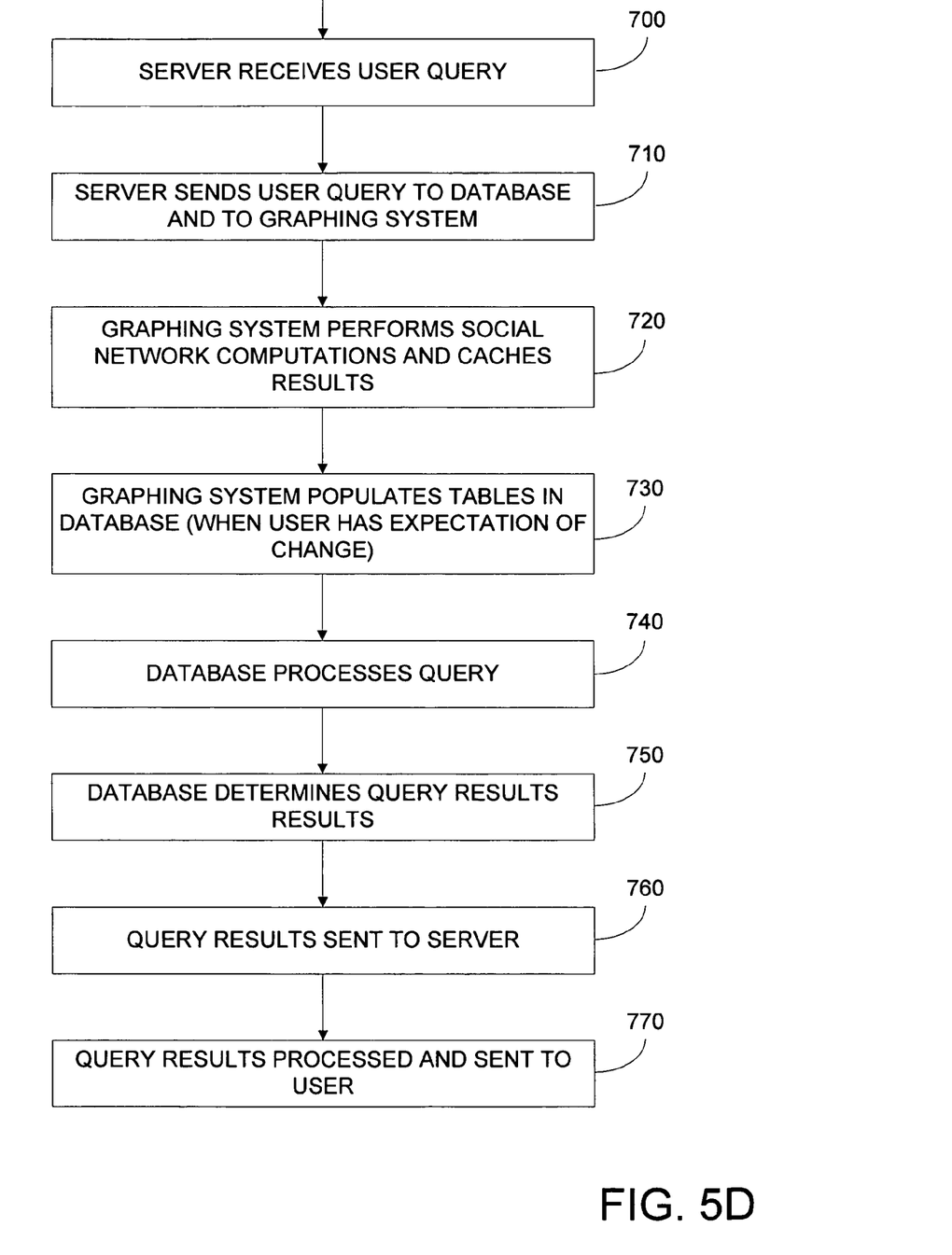

In the embodiment in FIG. 5D, the user sends the query to server 200, step 700. Next, server 200 sends the query to database 210 and graphing system 220, step 710. In this embodiment, social distance data is represented as one or more temporary tables in database 210. The social distance tables are populated by graphing server 220 in response to the query. In the present embodiment, graphing system 220 performs the social distance computations and caches the results, step 720, and then graphing system 220 populates the social distance tables in database 210 with the cached results, step 730. Database 210 then processes the query, relying upon the social distance tables, step 740, and determines results, step 750. In various embodiments, database 210 performs a JOIN with the temporary social distance tables. The returns are then sent to server 200, step 760, which in turn provides the result to the user, step 770. In various embodiments, the social distance tables are populated by graphing server 220 in response to the query, or have been cached in advance of the query. The caching can be done in anticipation of such a query, for example, when the user logs into a session in the system, the computation can be performed and the results may be cached for that session.

In still other embodiments of the present invention, additional methods for integrating social distance calculations and database queries are contemplated. For example, another method is through use of a "custom storage engine." In such embodiments, by intercepting the way database 210 appears to write to data to storage, graphing system 220 can act as a first class database object like any other relational table.

In yet another embodiment, graphing system 220 is directly or indirectly sent the social distance query (e.g. from server 200 or database 210). In response, a string representing users who satisfy the social distance query is sent to database 210. The string is then put in the form of an IN clause. For example, if user 1, user 4, and user 5 were identified, the IN clause to database 210 would be similar to IN(1,4,5). By doing this, the results of the query in database 210 would be restricted to the users identified in the IN clause. In various embodiments, server 200 may send the social distance query to graphing system 220, in response, graphing system 220 returns the users satisfying the social distance calculation, next, server 200 forms an SQL query or the like to database 210 including the IN clause specifying the identified users, as was described above. In another embodiment, server 200 may directly determine results for the social distance query based on cached data in server 200. As above, server 200 may then form the IN portion of an SQL query that is sent to database 210.

In various embodiments, because social relationship data, group affiliations, interests, and other data of users are available within the graphing system, collaborative filtering operations can easily be performed in real-time. Such operations may include: determining connected tribes to a user—tribes that are similar to a tribe the user is a member of (based upon membership overlap); determining connected people to a user—people that have similar interests as a user, similar tribe membership, or the like; determine suggested tribes to a user—tribes that may be of interest to a user based upon the memberships of a user's friends, co-workers, and the like; determine suggested listings to the user—classified listings, job posts, and the like that may be of interest to the user based upon viewership of the listing by the user's friends, people having similar interests as the user, and the like. More generally, any individual, tribe, implied tribe, or the like, may use decisions made by other persons, tribes, or the like, to help identify classified listings, web-sites, or the like, that are more likely to satisfy a user's needs via the above collaborative filtering. The system described above makes such collaborative data available in real-time.

In one embodiment, collaborative filtering may be implemented in conjunction with search engines such as Yahoo, Google, MSN search, and the like. In such embodiments, clicks on specific links by previous users may be combined with social network collaborative filtering, described above, to determine a priority for search results. For example, a first user is a member of an affinity group such as an "toy airplane affinity group," and a second user is a member of a "fashion affinity group." If the first user searches for the terms "model" and "photography," the search engine may initially identify a number of search result links. Subsequently, based upon selected search result links of other members in the same "toy airplane affinity group," the search engine will promote links about "hobby supplies," "macro photography," "aviation" and the like, for the first user. In contrast, if the second user searches for the same terms "model" and "photography," the search engine may again identify the same number of search result links. However, based upon selected search result links of other members in the "fashion affinity group," the search engine may promote links about "photographic supplies," "fashion models," "weight loss supplements" and the like, for the second user.

As another example, a search engine may prioritize results based upon prior searches performed by users closer than a determined distance away from the user. For example, a college student may search for "airlines" and "hotels." In such embodiments, the search engine may identify potential links to return to the student, then, based upon searches performed by users less than a social distance of, for example, two away from the user, the college student's results may be prioritized. If many of the student's friends are planning trips to Ft. Lauderdale, the search results for "airlines" and "hotels" may prioritize links describing "Spring Break packages to Florida," "Miami nightlife guides," "tanning salons" and the like. In contrast, a retiree searching on the same terms "airlines" and "hotels" may have links such as "term life insurance," "time-share condominiums," "prescription drugs" prioritized, based upon prior searches of close friends of the retiree.

Additionally, in various embodiments, the similarity function used for the collaborative filter may be based upon any combination of overlap between groups, individuals, and/or interest groups of the user. Additionally, different weights may be set for the different relationships for a user. For example, the importance of friends, the importance of the user's interests, the importance of similarly view items, and the like may be different. Further, the weights may be different for different users.

In still other embodiments of the present invention, server 200 may be used to unify two or more social networks into one complete network, termed a "People Web." In various embodiments, a user may establish identities in two separate social networks. In such embodiments, importing data from other social networks or other sites into embodiments of the present invention to determine overlapping identities can be performed with little, if any modification. In such embodiments, server 200, for example, graphing system 220 may be used to unify the identity of the user in the user network and the social map.

In one example, Paul is a member of social network A and a frequent forum poster on site B; Paul is a friend of Sue in social network A (i.e. Sue is a social distance of one away); and Paul and Mark often reply to each-other's posts on the forums on site B (i.e. they are members of an implied tribe, thus Mark is a social distance of 1.5 away). Thus, by linking Paul from network A to Paul on site B, depending on the weights on the links, Mark may be within Sue's social map (e.g. Mark is a social distance of 2.5 away). In contrast, without linking Paul from network A to Paul on site B, Mark and Sue may have an extremely large social distance. In other embodiments, social distances or other trust-metrics may be computed based upon any of the above-described relationships, such as, amount of communication between the parties, the importance or weight of relationships, the amount of affinity group overlap, the common interests, and the like.

In various embodiments of the present invention, the term social map and social network may also refer to the entire set of first degree relationships of all users. Similarly, the term user social map or user social network, or social map for a user or social network for a user may also refer a group of other users who are connected to the user who are within a specific social distance from the user. In embodiments of the invention, the terms may be interchanged, and depend more upon context of the usage.

Further embodiments can be envisioned to one of ordinary skill in the art after reading this disclosure. In other embodiments, combinations or sub-combinations of the above disclosed invention can be advantageously made. The specification, accordingly, is to be regarded in an illustrative rather than a restrictive sense. It will, however, be evident that various modifications and changes may be made thereunto without departing from the broader spirit and scope of the invention as set forth in the claims.

What is claimed is:

1. A method for a computer system includes:
   computing a social map for a first user, the social map including a plurality of different social distances between a plurality of users in a computer network, wherein a first profile is provided for the first user and includes a first social distance between the first user and a second user, and wherein a second profile is provided for the first user and includes a second social distance between the first user and a third user and the second profile includes no information about the second user, the first social distance and the second social distance being different, and wherein a weighting factor is used in determining the first social distance such that responsiveness in e-mail messaging between the first user and the second user reduces the first social distance;
   storing the social map for the first user during a user web session in a cache, wherein the social map is computed during log-in time for the user and a cached copy of the social map is stored in the cache, and wherein, while the user is logged into the user web session, an evaluation of the cached copy of the social map is performed in order to identify dirty bits, which are indicative of the cached copy of the social map being stale and requiring an update to be performed during the user web session;
   receiving a first change to relationship data for the first user during the user web session, the first change made by the first user;
   receiving a second change to the relationship data for the first user during the user web session, the second change made by another user;
   computing a revised social map for the first user during the user web session in response to receiving the first change, wherein the revised social map for the first user reflects the first change and the second change only if the first user ratifies the second change;
   storing the revised social map for the first user during the user web session in the cache;
   updating a database to include the revised social map;
   receiving a request from the first user for at least a portion of the revised social map for the first user; and
   providing at least a portion of the revised social map to the first user from the cache during the user web session.

2. The method of claim 1 wherein the first change is selected from a group consisting of: the first user adding new relationship data, the first user deleting relationship data, the first user confirming relationship data.

3. The method of claim 1 wherein the first change is selected from a group consisting of: the first user adding a link to another user, the first user joining an affinity group, the first user specifying an interest.

4. The method of claim 1 wherein the second change is selected from a group consisting of: the other user adding a new link to the first user, the other user adding a new link to an additional user, the other user deleting a link to the first user, the other user deleting a link to an additional user.

5. The method of claim 1 further comprising:
   determining a plurality of users from the revised social map for the first user during the user web session;
   determining a plurality of interests for the plurality of users during the user web session, and
   providing a list of the plurality of interests to the first user during the user web session.

6. The method of claim 5 wherein the plurality of interests are selected from a group consisting of: affinity groups the first user is not a member of, classified listings the first user may be interested in viewing, users the first user may be interested in communicating, businesses the first user may be interested in.

7. A computer system includes:
   a memory configured to store relationship data for a user;
   at least one processing unit coupled to the memory, wherein the processing unit is configured to:
   compute a social map for the first user, the social map including a plurality of different social distances between a plurality of users in a computer network, wherein a first profile is provided for the first user and includes a first social distance between the first user and a second user, and wherein a second profile is provided for the first user and includes a second social distance between the first user and a third user and the second profile includes no information about the second user, the first social distance and the second social distance being different, and wherein a weighting factor is used in determining the first social distance such that responsiveness in e-mail messaging between the first user and the second user reduces the first social distance,
   receive a first change to the relationship data for the first user during a user web session, wherein the social map is computed during log-in time for the user and a cached copy of the social map is stored in a cache, and wherein, while the user is logged into the user web session, an evaluation of the cached copy of the social map is performed in order to identify dirty bits, which are indicative of the cached copy of the social map being stale and requiring an update to be performed during the user web session,
   receive a second change to relationship data for the first user during the user web session, the second change made by another user,
   compute a revised social map for the first user during the user web session in response to receiving the first change, wherein the revised social map for the first user reflects the first change and the second change only if the first user ratifies the second change;
   wherein the memory is also configured to store the first change to the relationship data for the first user and to store the second change to the relationship data for the first user in the revised social map;
   wherein the processing unit is also configured to receive a request from the first user for the revised social map for the first user;

wherein the processing unit is configured to retrieve the revised social map from the cache during the user web session; and wherein the processing unit is configured to provide the revised social map to the first user during the user web session.

8. The computer system of claim 7 wherein the first change is selected from a group consisting of: the first user adding new relationship data, the first user deleting relationship data, the first user confirming new relationship data.

9. The computer system of claim 7 wherein the new relationship data is selected from a group consisting of: the first user adding a link to another user, the first user joining an affinity group, the first user specifying an interest in a classified listing.

10. The computer system of claim 7 wherein the second change is selected from a group consisting of: the other user adding a new link to the first user, the other user adding a new link to an additional user, the other user deleting a link to the first user, the other user deleting a link to an additional user.

11. The computer system of claim 7
wherein the processing unit is also configured to determine a plurality of users from the revised social map for the first user during the user web session;
wherein the processing unit is configured to determine a plurality of interests for the plurality of users during the user web session; and
wherein the processing unit is configured to provide a list of the plurality of interests to the first user during the user web session.

12. The computer system of claim 11 wherein the plurality of interests are selected from a group consisting of: affinity groups the first user may be interested in joining, classified listings the first user may be interested in viewing, users the first user may be interested in communicating with, businesses the first user may be interested in, products the first user may be interested in.

13. A computer program product comprising a tangible media comprising executable code for a computer system including a processor and a memory including relationship data for a first user includes:

code that directs the processor to compute a social map for the first user upon initiation of a web session, the social map comprising relationship data for the first user, wherein a first profile is provided for the first user and includes a first social distance between the first user and a second user, and wherein a second profile is provided for the first user and includes a second social distance between the first user and a third user and the second profile includes no information about the second user, the first social distance and the second social distance being different, and wherein a weighting factor is used in determining the first social distance such that responsiveness in e-mail messaging between the first user and the second user reduces the first social distance;

code that directs the processor to cache the social map for the first user during the web session, the social map including a plurality of different social distances between a plurality of users in a computer network, wherein the social map is computed during log-in time for the user and a cached copy of the social map is stored in a cache, and wherein, while the user is logged into the web session, an evaluation of the cached copy of the social map is performed in order to identify dirty bits, which are indicative of the cached copy of the social map being stale and requiring an update to be performed during the web session;

code that directs the processor to determine a first change to the relationship data for the first user during the web session, the first change made by the first user; code that directs the processor to determine a second change to the relationship data for the first user during the web session, the second change made by another user; code that directs the processor to compute a revised social map for the first user during the web session in response to determining the first change, wherein the revised social map for the first user reflects both the first change to the relationship data for the first user and the second change to the relationship data for the first user only if the first user ratifies the second change;

code that updates a database to include the revised social map;

code that directs the processor to receive a request from the first user for at least a portion of the revised social map for the first user; and code that directs the processor to provide at least a portion of the revised social map to the first user from the cache during the web session;

wherein the codes reside on a tangible media.

14. The computer program product of claim 13 wherein the first change to the relationship data for the first user is selected from a group consisting of: the first user adding new relationship data, the first user deleting relationship data, the first user confirming new relationship data, the first user confirming deletion of relationship data.

15. The computer program product of claim 14 wherein adding the new relationship data is selected from a group consisting of: the first user adding a relationship to another user, the first user joining a tribe, the first user specifying an interest.

16. The computer program product of claim 14 wherein the second change to the relationship data for the first user is selected from a group consisting of: the other user adding a relationship to the first user, the other user adding a relationship to an additional user, the other user deleting a relationship with the first user, the other user deleting a relationship to an additional user.

17. The computer program product of claim 13 further comprising:

code that directs the processor to determine a plurality of users from the revised social map for the first user during the web session;

code that directs the processor to determine a plurality of interests for the plurality of users during the web session; and code that directs the processor to provide a list of the plurality of interests to the first user during the web session;

wherein the plurality of interests are selected from a group consisting of: affinity groups the first user is not a member of, classified listings the first user may be interested in viewing, users the first user may be interested in communicating, businesses the first user may be interested in.

* * * * *